Figure 26:
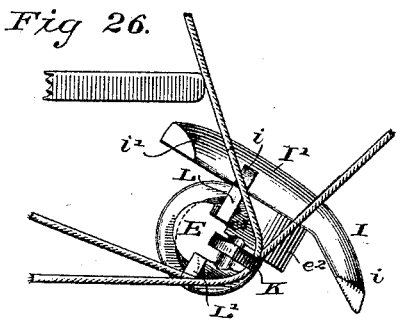
Figure 29:
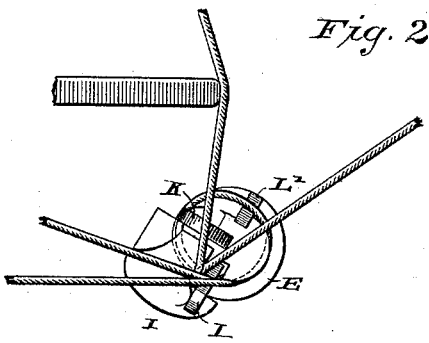
Figure 27:
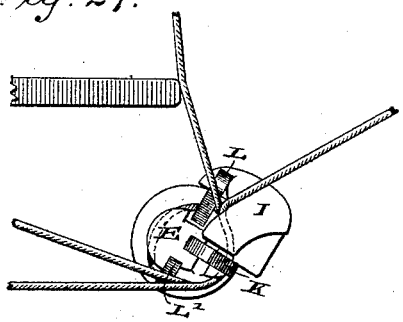

(Model.) 6 Sheets—Sheet 1.
J. S. DAVIS.
BAND SECURING MECHANISM FOR GRAIN BINDERS.
No. 412,914. Patented Oct. 15, 1889.
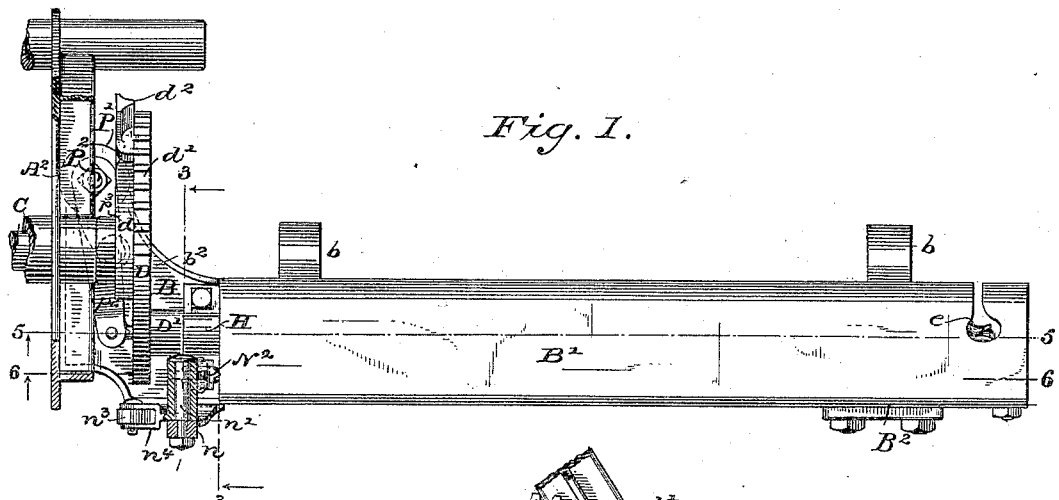
Fig. 1.
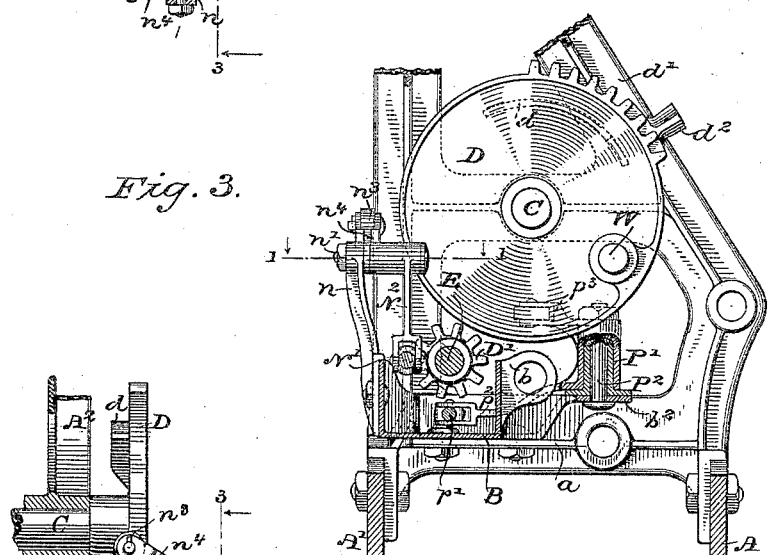
Fig. 3.
Fig. 2.
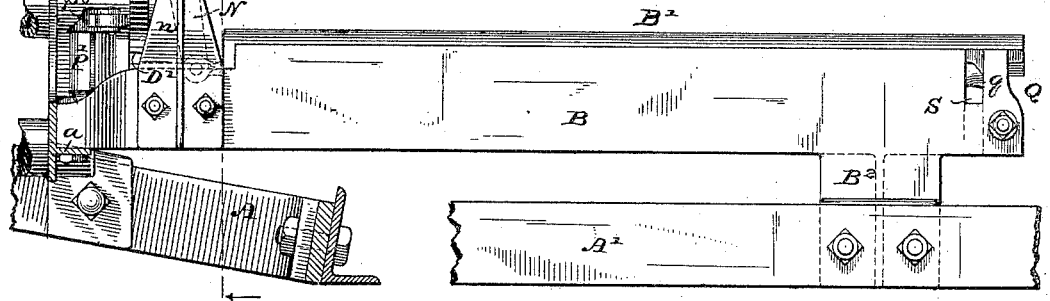
Witnesses
Geo. W. Young.
Henry A. Lamb.
Inventor
John S. Davis.
By Attorneys (Model.)
6 Sheets—Sheet 2.
J. S. DAVIS.
BAND SECURING MECHANISM FOR GRAIN BINDERS.
No. 412,914.  Patented Oct. 15, 1889.
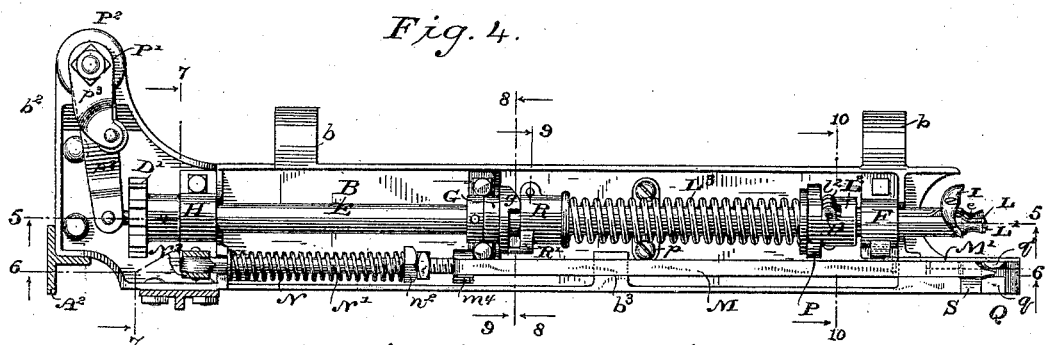
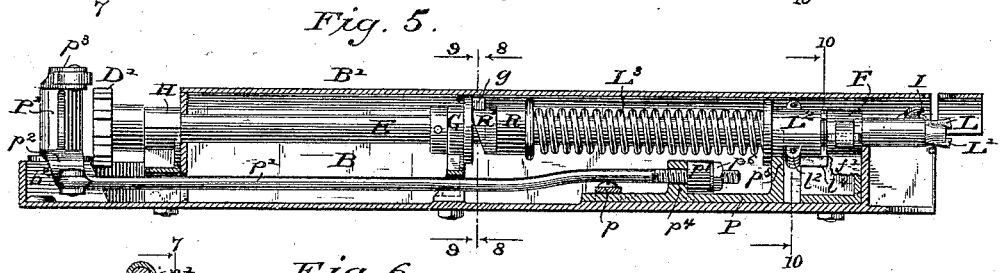
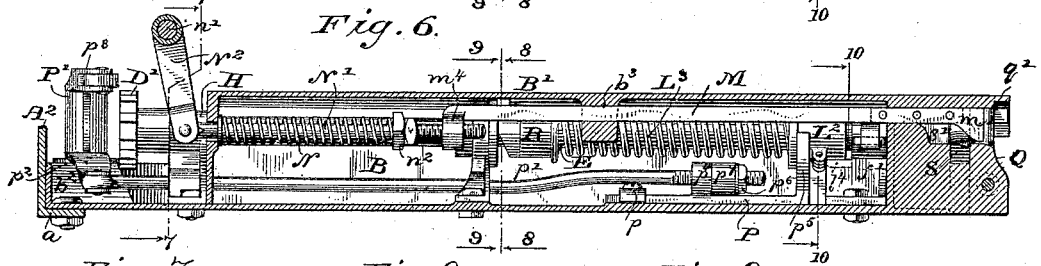
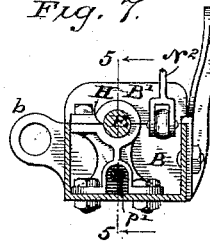
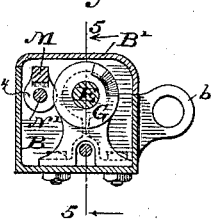
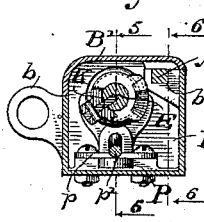
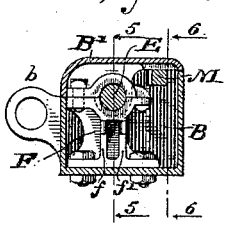
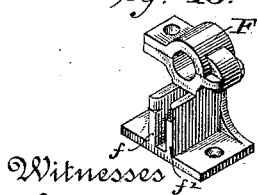
Witnesses
Geo. W. Young.
Henry A. Lamb.
Inventor
John S. Davis
By his Attorneys
Jammu and Srinkly
N. PETERS, Photo-Lithographer, Washington, D. C.

(Model.) 6 Sheets—Sheet 3.
J. S. DAVIS.
BAND SECURING MECHANISM FOR GRAIN BINDERS.
No. 412,914. Patented Oct. 15, 1889.
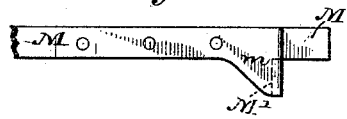
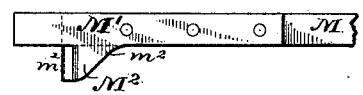
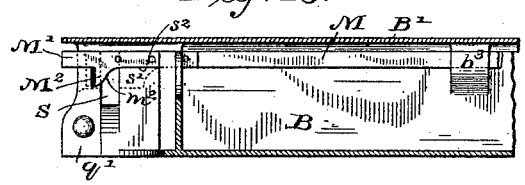
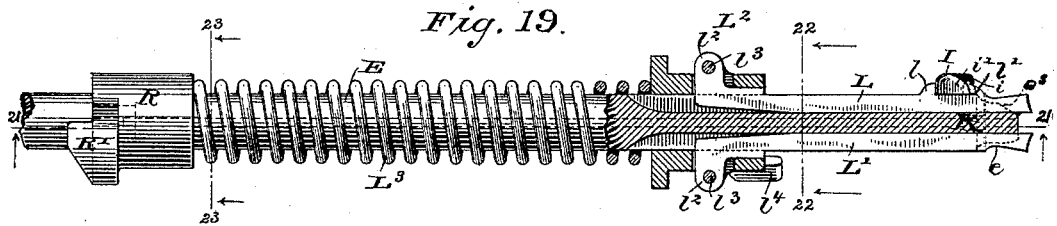
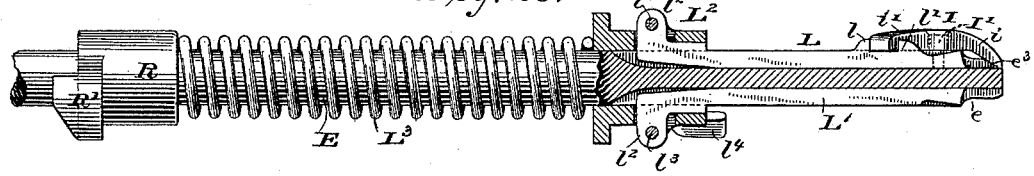
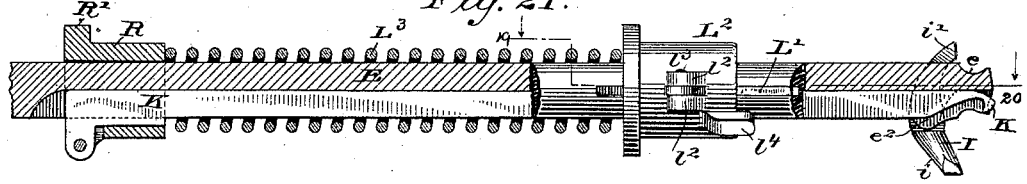
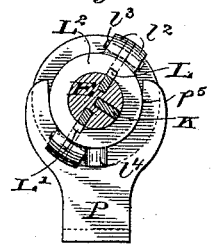
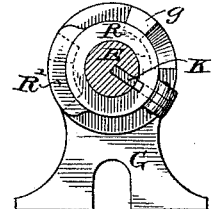
Witnesses
Geo. W. Young.
Henry A. Lamb.
Inventor
John S. Davis
By his Attorneys (Model.) 6 Sheets—Sheet 4.
J. S. DAVIS.
BAND SECURING MECHANISM FOR GRAIN BINDERS.
No. 412,914. Patented Oct. 15, 1889.
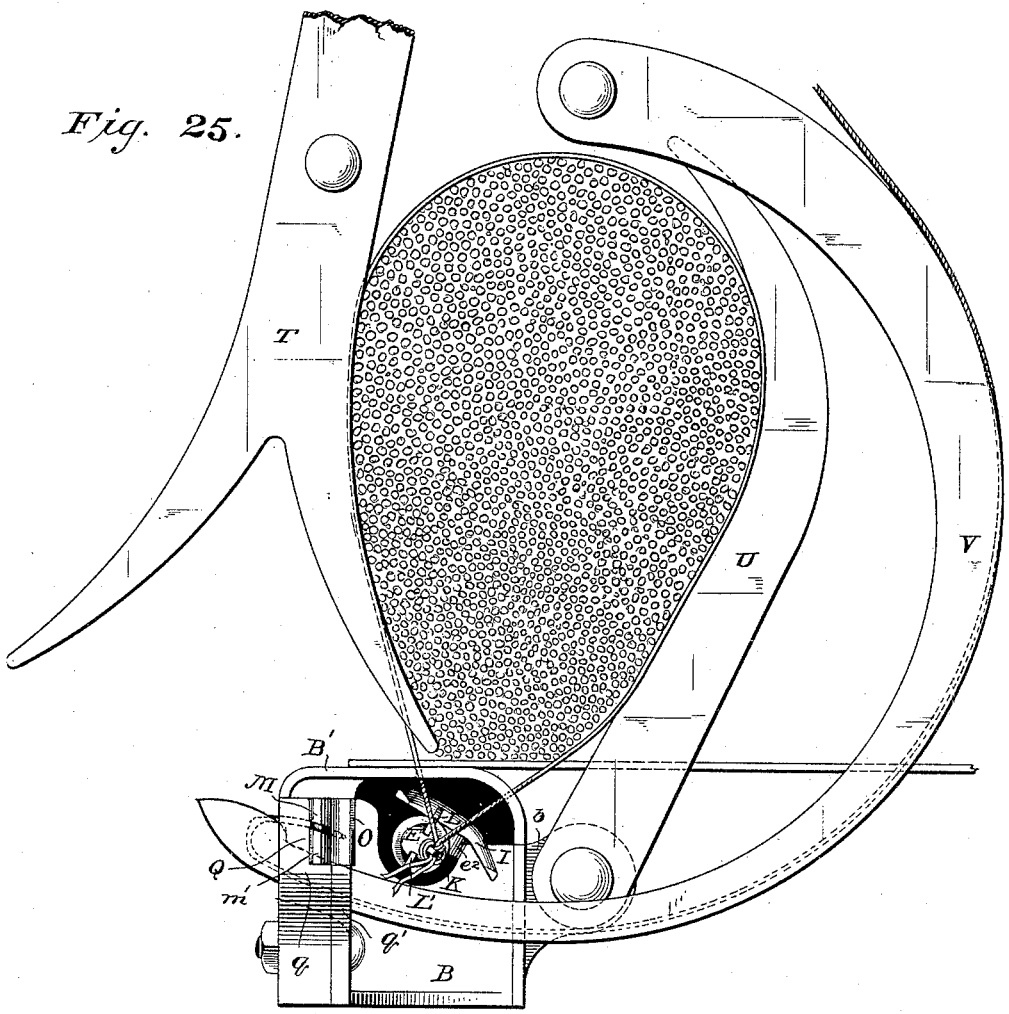
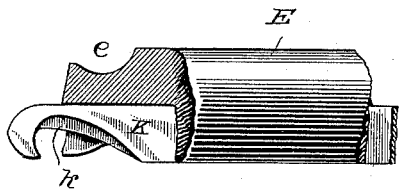
Witnesses
Geo. W. Young
Henry A. Lamb
Inventor
John S. Davis
By his Attorneys (Model.)  6 Sheets—Sheet 5.

J. S. DAVIS.
BAND SECURING MECHANISM FOR GRAIN BINDERS.

No. 412,914. Patented Oct. 15, 1889.

Witnesses
Geo. W. Young
Henry A. Lamb

Inventor
John S. Davis
By his Attorneys (Model.)
J. S. DAVIS.
BAND SECURING MECHANISM FOR GRAIN BINDERS.
No. 412,914. Patented Oct. 15, 1889.
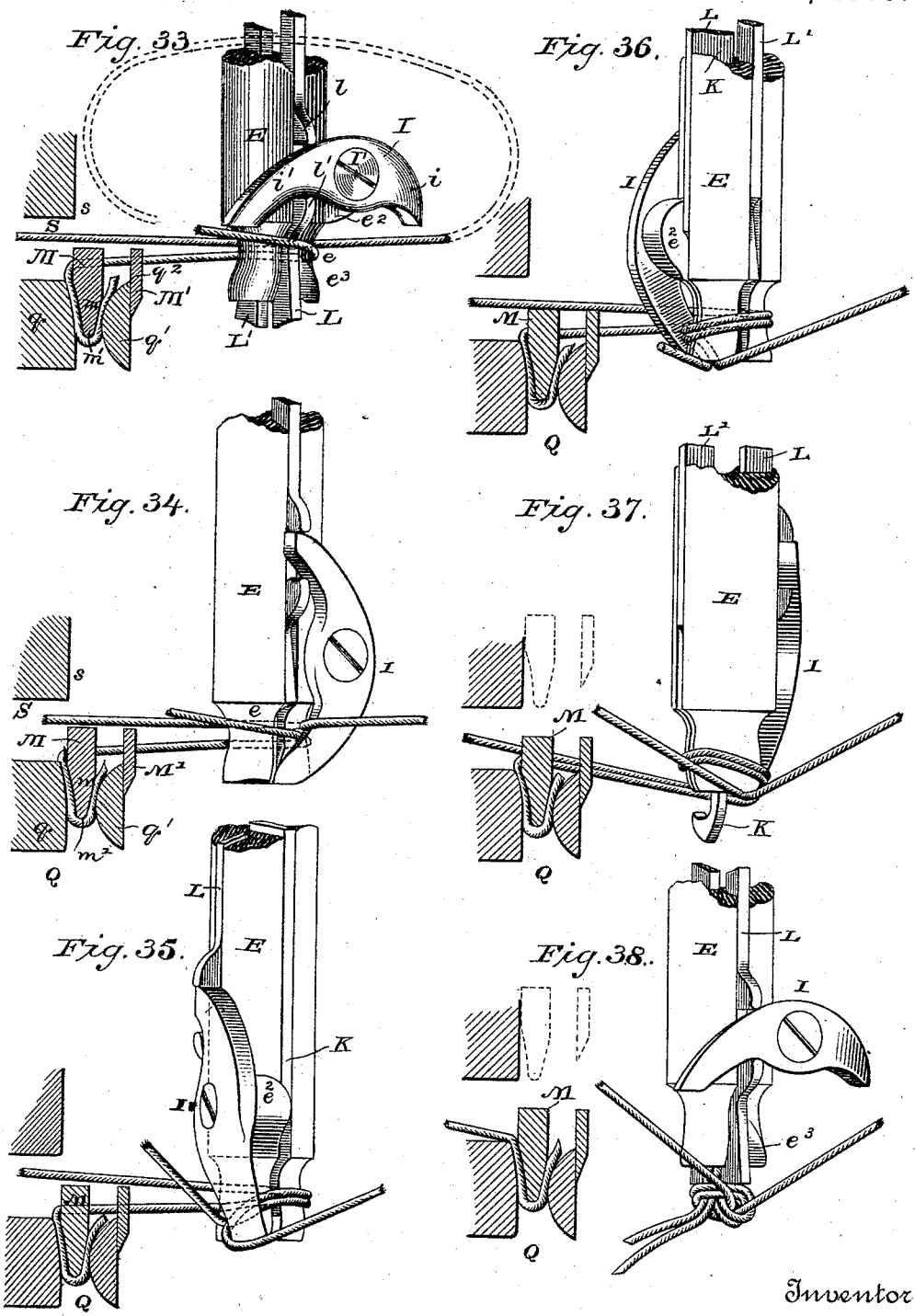
Witnesses
Geo. W. Young
Henry A. Lamb
Inventor
John S. Davis
By his Attorneys

UNITED STATES PATENT OFFICE.

JOHN S. DAVIS, OF TOLEDO, ASSIGNOR TO ADIEN E. SUMNER, OF CLEVELAND, OHIO.

BAND-SECURING MECHANISM FOR GRAIN-BINDERS.

SPECIFICATION forming part of Letters Patent No. 412,914, dated October 15, 1889.

Application filed August 7, 1885. Serial No. 173,868. (Model.)

*To all whom it may concern:*

Be it known that I, JOHN S. DAVIS, a citizen of the United States, residing at Toledo, in the county of Lucas and State of Ohio, have invented certain new and useful Improvements in Band-Securing Mechanism for Grain-Binders, of which the following is a specification, reference being had to the accompanying drawings.

My invention has for its object the improvement of band-securing mechanism for grain-binding harvesters; and it consists particularly in details of construction and in the manner of operating the mechanism embodying my improvements in the best form now known to me.

As shown in the accompanying drawings, my improved knotting mechanism is particularly adapted to operate in conjunction with the grain-gaveling mechanism shown and described in an application for Letters Patent filed by me May 27, 1885, Serial No. 166,849, and it is, with said gaveling mechanism, mounted upon a harvester-frame shown and described in Letters Patent numbered 388,765, granted to me August 28, 1888; but it might, of course, with slight modifications, be adapted to operate with many of the well-known forms of grain-binding harvesters and suitably supported upon any harvester-frame.

Such portions of a binding mechanism as I consider necessary for a proper illustration of my invention are shown in the accompanying drawings; but they form no part of the invention herein claimed.

In the drawings, Figure 1 is a plan of the knotter-box and the actuating or master wheel of the knotting mechanism, partly in section, on the lines 1 1 of Figs. 2 and 3. Fig. 2 is a side elevation of the same, showing also adjacent portions of the harvester-frame upon which the knotter is supported, the frame being partly in section and partly broken away for convenience of illustration. Fig. 3 is a vertical transverse section of the same on the lines 3 3 of Figs. 1 and 2, showing in detail the means through which the master-wheel communicates motion to the several parts of the cutting, clamping, and tying mechanism. Fig. 4 is a plan view, partly in section, of the knotter-box, the cover being removed to expose the mechanism beneath it. Fig. 5 is a central longitudinal section through the knotter-box on the lines 5 5 of Figs. 1, 4, 7, 8, 9, and 10. Fig. 6 is a similar view on the lines 6 6 of the same figures. Figs. 7, 8, 9, and 10 are vertical transverse sections across the knotter-box and its inclosed mechanisms on the lines 7 7, 8 8, 9 9, and 10 10, respectively, of Figs. 4, 5, and 6, and as seen from the directions indicated by the arrows on the said section-lines. Fig. 11 is a perspective view of the rear end of the knotter-box with the cover and operating parts removed. Fig. 12 is a perspective view of the detachable portion of the stationary member of the cord-clamp. Fig. 13 is a perspective view of the detachable bearing-standard which supports the rear end of the knotter-shaft. Figs. 14, 15, 16, and 17 are detached detail views of the rear end of the bar which constitutes the moving member of the cord-clamp and cutter. Fig. 18 is a sectional view through the knotter-box, showing the shear and clamping-bar in place relatively to the fixed member of the shear and clamp. Fig. 19 is a detailed view, on an enlarged scale and partly in section on the line 19 and 20 of Fig. 21, of the rear end of the knotter-shaft with the knotter bill-hook opened or thrown back for the admission of the binding-cord. Fig. 20 is a similar view with the knotter bill-hook in the position it assumes when closed down upon the cord preparatory to forming the knot. Fig. 21 is a longitudinal section of the same on the line 21 21 of Fig. 19, the section being taken at right angles to that shown in Fig. 19, the operating parts being shown in the same position as those in the said figure. Fig. 22 is a transverse section on the line 22 22 of Fig. 19. Fig. 23 is a similar section on the line 23 23 of Fig. 19. Fig. 24 is a detailed sectional view of the end of the knotter-head as seen from the side opposite that shown in Fig. 21, and showing more particularly the cutting-edge on the looping-hook. Fig. 25 is a detailed view of the rear end of the knotter-box, showing the compressor, retainer, and needle arms of a suitable binding mechanism in proper relation thereto and embracing a bundle which is being bound. Figs. 26 to 32, inclusive, are end views of the knotter-head, shown at several stages of the knotting operation. Figs. 33 to 38, inclusive, are plan or top views of the same, corresponding in position to Figs. 26 to 31.

Upon bars A A', which form part of a harvester-frame and its rigidly-attached platform, as described in the before-mentioned applications, is mounted a casting or standard A², which constitutes part of the supporting-frames for the gaveling mechanism, and also supports the portions of the knotting mechanism, as herein described. This knotting mechanism is inclosed in suitable frame or casing B, provided with a detachable cover B'. At its front end the casing rests upon and is securely bolted to a flanged rib $a$ of the standard A², while its rear end is provided with a downwardly-extending foot B², which is bolted to the outer side bar A' of the platform and is suitably ribbed to give it the requisite strength. Lugs $b$ project from the inner or grain side of the casing and are bored to afford suitable bearings for the rockshaft of a compressor-arm U of the binding mechanism.

The main shaft C of the gaveling mechanism is mounted in suitable bearings in the standard A² and makes one complete revolution for each bundle to be bound. A crank plate or disk D on the projecting end of the shaft imparts motion to the gaveling mechanism, and also serves to control and operate the knotting mechanism. A cam $d$ on the master-wheel D closes and holds the bill-hook of the knotter-head upon the cord during the tying operation. A geared rack $d'$ on its periphery rotates the knotter-head through a complete revolution, and a cam-lug $d^2$, also on its periphery, actuates the cord holding and cutting mechanism at the proper moments.

A continuous or solid knotter-shaft E extends through the entire length of the box, and is supported therein in suitable bearings F, G, and H. A pinion D' is attached to the front end of the shaft, and is engaged at suitable intervals by the geared rack $d'$ on the cam-plate. At its rear end the shaft is suitably shaped to form the knotter-head and to afford support for a pivoted bill-hook I, and it is also provided with a series of longitudinal grooves or channels in which the looping-hook K and push-fingers L of the knotter reciprocate, as will be hereinafter described.

Figure 32:
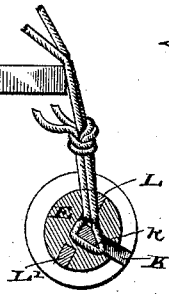

The cord-holding mechanism consists of a reciprocating bar M, mounted in suitable bearings beside the knotter-shaft and provided at its rear end with a rounded or wedge-shaped point, which enters a recess in the stationary member of the holder and jams the cord against the adjacent sides, securely holding it. This bar is urged rearwardly to its clamping position by a spring N, and is retracted by the cam $d^2$ on the master-wheel D. On the inner side of its rear or clamping end it is provided with a shear or knife M', which severs the cord at the moment it is clamped. The knotter-shaft is reduced in diameter near its rear end to form a rounded depression or groove $e$, the rear side of which forms a projecting ledge $e'$ at the extreme end of the shaft, this ledge being cut away upon two of the sides and rounded over on the end, as clearly shown in Figs. 19 and 20, to accelerate the casting off of the loop. Deep and narrow grooves are formed on the shaft upon each of these two sides, in which reciprocate fingers or push-bars L L', whose joint office is to push the loop from off the neck of the knotter-head at or near the completion of the knotting operation, while the bar L also serves to actuate the vibrating bill-hook I. An enlargement or boss $e^2$ is formed upon one side of the shaft near the head, upon which is pivoted the bill-hook, peculiarly shaped, as shown in numerous figures of the drawings. The portion of the hook $i$ lying at the outside or rear of the pivot I' closes over the neck or groove in the knotter-head and fits snugly, when closed, against an inclined or cut-away portion $e^3$ of the knotter-head, preventing the escape of the cord when it has closed down upon it. The inner or front portion $i'$ of the hook consists of a curved or rounded tail, the projecting end of which lies across the outer edge of the push-finger L and is embraced between two projections or studs $l\ l'$ thereon, which, as the finger is reciprocated, act upon the inclined or curved portions of the tail and vibrate the hook on its pivot to open or close it, as the case may be. By an inspection of the drawings it will be noticed that the tail of the hook is so shaped that it snugly fits the space between these lugs at every portion of the stroke and is at all times positively controlled by the push-bar L, and, further, that when the bill-hook is closed on the cord and subjected during the knotting operation to the greatest strain, tending to open it, the push-finger is holding it at the point of greatest advantage—that is, the extreme end of the tail. As before stated, when the bill-hook is closed its inner face fits snugly in this recess $e^3$, while its outer side face is curved over to gradually merge into or conform to the plane of the end of the shaft, so that the cord shall slip freely off the back of the hook and past the end of the shaft at the several stages of the knotting operation, as shown. While the knot is being formed the hook I is closed down upon the head and the push-fingers L L' are drawn back with their ends beyond the groove or neck; but when the knot is completed these fingers are moved outwardly, pushing the loop off the neck and end of the shaft and opening the bill-hook to permit the exit of the loop and place it in position for the reception of the cord for the next bundle. The push-fingers are controlled by a sliding collar L² on the knotter-shaft inside of the bearing or journal-box F. On opposite sides of the collar are two pairs of projecting lugs or ears $l^2$, between which the push-fingers are secured by means of pins $l^3$, passing through the ears and corresponding projections on the front ends of the fingers, which extend through apertures in the collar corresponding with the spaces between the ears, and also serve as feathers to compel the collar and shaft to rotate together. A coiled spring $L^3$ around the shaft bears against the front face of this collar and normally urges it to its most advanced position, projecting the push-fingers rearwardly and opening the bill-hook. An annular flange or projection on the front end of the collar bears against the prongs or fingers of a sliding bar P, which reciprocates in a suitable guideway $p$, formed in the bottom of the knotter-box. This bar is connected by a link $p'$ with one arm $p^2$ of a double-crank lever P', pivoted at $P^2$ on a projection $b^2$, extending from the front end of the knotter-box, the other arm $p^3$ of which carries an anti-friction roller operated upon by the cam-ledge $d$ on the front face of the master-wheel. At the beginning of the knotting operation this cam passes under the roller, retracting the collar and push-fingers, thereby closing the bill-hook. To prevent accidental rotation of the shaft and to lock it securely in place, the collar $L^2$ is provided with a projecting lug $l^4$, which when the knotter is in its normal position of rest lies between two ribs or flanges $f f'$, cast upon the bearing-standard F'. This positively locks the shaft against rotation until the collar is retracted and the bill-hook closed, which movements, occurring at the beginning of the operation, unlock the shaft, as stated. The sliding bar P, which retracts the collar, consists of a flat plate provided on its upper surface with two projections $p^4$ $p^5$, the latter of which is recessed to fit round the collar $L^2$ and bear against its flange, as before stated, while the other is perforated for the reception of the connecting-rod $p'$. This rod is screw-threaded at its rear end, upon which is a nut $p^6$ and washer to provide for necessary adjustments in the length. A block of rubber $p^7$ or other elastic material is interposed between the nut and the projection $p^4$, which will yield slightly in the event of the mechanism being so adjusted as to bring undue pressure on the bill-hook by the positive movement of the double lever when retracting the sliding collar. The bearing F is formed on a loose block or standard, as clearly shown, which is securely bolted to the bottom of the box, though it might be cast with it. A loose cover, forming the top of the bearing, is provided at one side with a hooked projection, which lies in a recess between two projecting ears or lugs and catches under a ledge, while the other side is held in place by a single screw-bolt. The edges of the ribs $f f'$, between which the locking-lug $l^4$ on the sliding collar $L^2$ enters, are rounded, as shown, to facilitate the entrance of the lug between them. In addition to the push-fingers and bill-hook the knotter-head is also provided with a reciprocating hook K, which reciprocates in a narrow longitudinal groove in the shaft, similar to the groove in which the push-fingers lie, being located between them and at the side of the shaft on which the bill-hook is pivoted. This hook normally lies within and is shielded by the projecting ledge at the end of the shaft; but at the proper moment it is projected therefrom to catch the strands which slip off the bill-hook and fall across the end of the shaft, and, being retracted, holds them securely and forms the bight of the knot, while the loop formed about the neck of the knotter-head is thrust therefrom by the push-fingers. The hook and the groove in which it reciprocates extend to about midway the length of the shaft, where the shank of the hook is united to a collar R in a manner similar to that in which the push-fingers L L' are united to the collar $L^2$, as clearly shown in Figs. 4, 9, 19, and 21. The collar, and with it the hook, is held in its most retracted position by the pressure of the spring $L^3$, (which also bears against the collar $L^2$,) but receives its advance motion by means of an incline or projection R' on its front face encountering in the course of its revolution a similar lug $g$ on the rear face of the fixed standard G, as clearly shown in Figs. 4, 5, 8, 9, and 23. The two lugs R' and $g$ are so situated relatively to each other that the reciprocating hook remains sheathed during about three-quarters of the revolution of the knotter-head. The two lugs then coming into contact, the collar is slipped along the shaft and the hook projected to catch the bight. As the lug on the collar passes off the fixed lug on the standard, the hook is suddenly retracted, drawing the bight into the groove with the full force of the compressed spring. At this moment the collar $L^2$ is suddenly released and thrust forward by the action of the spring, the push-fingers thrusting the bight from off the neck of the knotter-head and over the loop held in the groove by the hook K, as clearly shown in Figs. 31 and 38, the loop being thrown up toward or against the bundle, the tension of the cord around which immediately tightens the knot, as shown in Fig. 32, thus forming the knot at a point much closer to the bundle and binding it more tightly than would be the case if the loop were pulled off the neck of the knotter-head by the ejection of the bundle. This advance movement of the collar $L^2$ relieves the spring of all or nearly all compression, and so reduces the force or pressure exerted on the bight by hook K that it will yield slightly to permit of the disengagement or pulling off of the bight. To prevent any failure of the release of the bight, I sharpen the inner edge $k$ of the hook, as shown in Figs. 24 and 32, in order that the bight engaged by it will draw across a cutting-edge when the knotter-head is in its final position of rest and the bundle about to be ejected, so that in the event of the string not otherwise freeing itself from the knotter it will, by the exertion of a little more pressure, slightly retract the hook until it rests upon the cutting-edge, on the inner side thereof, and sever the bight engaged by the hook. It will be seen that when the knotter is in its position of rest the collars $L^2$ and R are farthest apart, and but little force, comparatively, is being exerted by the spring, which is then under its least compression; but the initial movement of retracting the collar $L^2$ compresses the spring sufficiently for the purpose of retracting the hook K when it subsequently engages the bight in the cord. The cord holder or clamp consists, as usual, of a fixed and a moving member, the former Q being cast with or made fast to the casing, while the latter M, as before stated, consists of a square bar reciprocating in suitable guideways. A pendent lug or projection $m$ is formed at the rear end of this bar, which, together with the rear vertical face of the lug, is wedge-shaped, terminating in a rounded point $m'$, the sides being slightly hollowed, as shown in Fig. 17. This lug is but half the width of the bar, and depends from the outer side or half thereof, its front face $m^2$ being inclined at an angle of forty-five degrees, or thereabout, and merges by an easy curve into the plane of the bottom of the bar. A steel plate $M'$ is riveted or suitably fastened to the inner side of the bar and projects beyond it, as shown by the several figures. A depending lug $M^2$ on this plate has an angular front face $m^3$, coincident with that of the lug $m$ on the holder-bar, while its rear vertical edge sets somewhat back of the rear vertical face of the lug $m$, and is beveled or sharpened to constitute the moving and cutting member of the shear. (See Figs. 4, 6, and 14 to 18, inclusive, and 33 to 38, inclusive.) The outer side of the knotter-box extends rearwardly beyond the plane of the bill-hook, (see Fig. 11,) and has two grooves S $s$ formed in its upper surface. These grooves lie at right angles to each other, the shallow longitudinal groove $s$ guiding and supporting the rear end of the holder-bar M, the deeper transverse groove S affording a passage for the point of the needle-arm below the holding and cutting devices, as clearly shown in Fig. 25. A deep recess $s'$ is formed in the bottom of the groove $s$, leaving a narrow wall or ledge $s^2$. When the holder-bar is retracted preparatory to taking a fresh grasp upon the string, the lug $m$ crosses the groove S and enters this recess $s'$, the bar resting and sliding on the ledge $s^2$, while the downwardly-projecting lug of the shear-blade slides against its inner face. The fixed member Q of the cord-clamp consists of two vertical posts $q\ q'$, rounded on their adjacent faces to present a suitable aperture or gap to the point of the holder-bar, which enters therein and clamps the cord against the posts, as shown by Figs. 4 and 33 to 38, inclusive. The post $q$ is cast with the knotter-box, while the post $q'$ (shown in detail in Fig. 12) is made separately therefrom and held in place by suitable bolt or otherwise. This latter post is made of a piece of steel, and in addition to its functions as a clamp also serves as the fixed member of the shear or cutter, the cutting-edge of the knife shearing against its front vertical edge $q^2$, the prolonged extension of the knife-plate $M'$ always rubbing or bearing against its outer face. The post $q'$ can readily be detached for the purpose of sharpening the shear ends or of replacing it when worn too much to be of further service. The square holder-bar M reciprocates in suitable bearings $s$ and $b^3$, formed in the knotter box or casing, the detachable cover of the case forming the cap to these bearings. At its front end the bar is provided with a downwardly-projecting lug $m^4$, having a screw-threaded perforation for the reception of the end of the screw-threaded rod $N'$, which extends through the rear end of the box, and is connected to the arm $N^2$ of a double lever pivoted at $n'$ on a bracket $n$, bolted to the side of the casing. The rod $N'$ is surrounded inside of the casing by a spiral spring N, one end of which bears against the wall of the casing, while its other end bears against a nut $n^2$ on the rod, by means of which the compression of the spring may be varied at pleasure. The holder-bar is advanced to its clamping position and there held by the pressure of this spring until withdrawn by the cam $d^2$ on the master-wheel D acting upon an antifriction roller $n^3$ on the arm $n^4$ of the double lever. The action of the knotter and co-operating parts of the gaveling mechanism will be readily understood by an inspection of the drawings.

Figure 30:
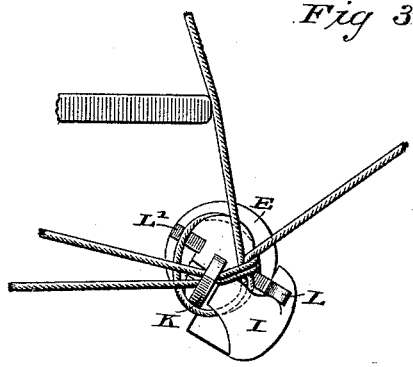
Figure 28:
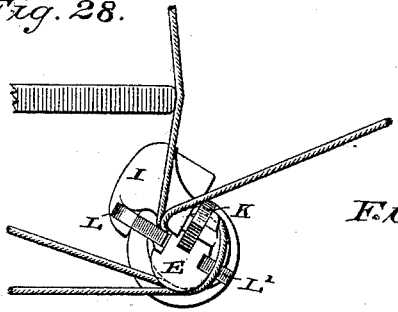
Figure 31:
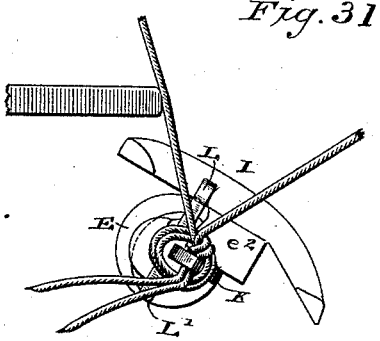

In Fig. 25 the retainer-arm T, the compressor-arm U, and the needle-arm V are similar in construction and operation to those shown in my application for Letters Patent No. 156,849, forming parts of the binding mechanism with which my knotter is particularly adapted to operate, and which receive their motion from the crank-pin W on the face of the master-wheel, as explained in said application. When sufficient grain has entered the gaveling-receptacle to form a bundle, it is compressed, as shown in Fig. 24, between the retainer and compressor arms, the needle-arm having only to present the string to the knotter, which it does, as shown in the several figures, its point passing through the groove S beneath the holder-bar M, which lies above the groove and back of the depending lugs or projections $m\ M^3$ of the holder and knife-blade, the cord lying upon the neck or depressed groove of the knotter-head, as shown in Figs. 25 and 33. The bill-hook I then closes down upon the cord lying upon the neck, and the knotter-shaft begins its revolution, the holder retaining its grasp upon the cord until the position indicated by Figs. 30 and 37 is reached. The looping-hook K is then projected from the knotter-head, and the loop ends, slipping off the bill-hook and over the end of the knotter-head, will fall into the hook, which is then suddenly retracted, firmly holding the string within the knotter-head. The holder-bar is retracted from across the groove S, the cord sliding down the inclined front faces of the depending projections, and, after they have passed, springing up against the extended end of the knife-bar to a position that will present it properly in front of the holder and shear projections. The holder-bar is released simultaneously with or immediately after the retraction of the looping-hook K and immediately springs back, the holder grasping and clamping the cord between the knotter-head and the needle-arm, and the cutters simultaneously severing it between the holder and the knotter-head. The prolonged portion of the knife-blade, or that portion extending beyond the cutting-edge, lies above the slot when the holder-bar is retracted and prevents the string from rising too far to be properly engaged by the holder and cutter.

By means of the arrangement shown I secure great simplicity of construction and certainty of action and render it easy to repair or replace any of the parts that might become weak or broken.

What I claim, and desire to secure by Letters Patent, is—

1. The combination of the knotter-shaft, a knotter-head having a reduced neck formed on the end of the shaft, and a bill-hook pivoted upon one side of the shaft and vibrating in a plane parallel to the axis thereof and at a right angle to a radial line therefrom, its outer curved end when closed lying over the neck and gradually merging into the plane of the end of the knotter-head, substantially as and for the purpose hereinbefore set forth.

2. The combination of a knotter-head having a reduced neck formed on the end of the knotter-shaft, a bill-hook pivoted upon one side of the shaft and vibrating in a plane parallel to its axis and at a right angle to a radial line therefrom, with a bar reciprocating longitudinally in a groove in the shaft and provided with two lugs which embrace the curved tail of the bill-hook, substantially as and for the purpose hereinbefore set forth.

3. The combination of a knotter-head having a reduced neck formed upon the end of the knotter-shaft, a bill-hook pivoted upon one side of the shaft, and push-fingers reciprocating in longitudinal grooves in the shaft, one of them being provided with lugs which embrace the curved tail of the bill-hook to vibrate it when the fingers are reciprocated, substantially as and for the purpose hereinbefore set forth.

4. The combination of a knotter-head having a reduced neck formed upon the end of the knotter-shaft, a bill-hook pivoted to one side of the shaft, push-fingers reciprocating in grooves in the shaft, one of said fingers controlling the movement of the bill-hook, and a sliding collar on the shaft, to which the push-fingers are attached, substantially as and for the purpose hereinbefore set forth.

5. The combination of the knotter-shaft, the vibrating bill-hook, reciprocating push-fingers, a sliding collar to which said push-fingers are attached, a spring for moving said collar outwardly to open the bill-hook, with means for retracting said collar against the stress of the spring and holding the bill-hook closed positively across the neck of the knotter during the tying operation, substantially as described.

6. The combination of a revolving knotter-shaft, a pivoted bill-hook and reciprocating push-fingers mounted thereon, a sliding collar to which the push-fingers are attached, a fixed bearing in which the shaft revolves provided with projecting flanges, and a lug on the reciprocating collar which takes in the space between the flanges in the bearings when the collar is thrust outwardly and the bill-hook opened to positively lock the shaft against rotation until the collar is retracted and the hook closed, substantially as described.

7. The combination of a knotter-shaft, a bill-hook and reciprocating push-finger mounted on said shaft and actuated by a sliding collar which also locks the shaft against rotation, a looping-hook also controlled by a sliding collar on the shaft, and a spiral spring wound round the shaft and bearing against both collars, with means for retracting the first-mentioned collar to close the bill-hook, unlock the shaft, and put the spring under compression, substantially as and for the purpose hereinbefore set forth.

8. The combination of a knotter-shaft, a bill-hook mounted thereon, a sliding collar provided with means for actuating the bill-hook and locking the knotter-shaft, substantially as described, a sliding plate having a forked projection which embraces the collar and bears against a flange thereon, a link-rod connecting the plate to a lever, and a master-wheel provided with a cam-ledge which bears against the lever to vibrate it on its pivot and retract the sliding collar on the shaft, substantially as and for the purpose described.

9. The combination of a knotter-shaft, a bill-hook, and push-finger positively controlled by a sliding collar, a sliding plate for retracting said collar, and a link-rod connecting said plate with a positively-actuated lever, with a spring or block of elastic material interposed between the link and the sliding plate, substantially as and for the purpose hereinbefore described.

10. The combination of a knotter-shaft and the pinion attached thereto and a bill-hook mounted thereon, a sliding collar provided with means, substantially as described, for locking the shaft against rotation, a master-wheel provided with a cam for actuating the collar through suitable means, and also a sector-gear which engages the pinion, substantially as and for the purpose hereinbefore described.

11. The combination of a knotter-shaft, a reciprocating looping-hook mounted thereon and controlled by a sliding collar, and a spring normally bearing with slight pressure against said collar, with cams, substantially as described, which give the spring its greatest compression when the hook is projected to catch the loop and then relieve it almost wholly of pressure after the hook is retracted, substantially as and for the purpose hereinbefore described.

In testimony whereof I affix my signature in presence of two witnesses.

JOHN S. DAVIS.

Witnesses:
J. H. SOUTHARD,
CARRIE T. SOUTHARD.